United States Patent [19]
Cummins et al.

[11] 3,831,442
[45] Aug. 27, 1974

[54] STRING TENSION MEASURING DEVICE
[75] Inventors: Millard M. Cummins; Richard H. Keates; Robert G. Best; Donald L. Barr, all of Columbus, Ohio
[73] Assignee: The Thurman Manufacturing Company, Columbus, Ohio
[22] Filed: Jan. 3, 1973
[21] Appl. No.: 320,769

[52] U.S. Cl. .................................. 73/144
[51] Int. Cl. .............................. G01l 5/06
[58] Field of Search.................. 73/144, 145, 139

[56] References Cited
UNITED STATES PATENTS
| 832,064 | 10/1906 | Keeler | 73/139 |
| 2,428,379 | 10/1947 | Naumann | 73/144 |
| 3,203,235 | 8/1965 | Stein | 73/144 |
| 3,608,371 | 9/1971 | Kessler | 73/144 |
| 3,679,808 | 7/1972 | Rohner et al. | 73/144 |

FOREIGN PATENTS OR APPLICATIONS
71,218 11/1970 Germany ............................ 73/144

Primary Examiner—Charles A. Ruehl
Attorney, Agent, or Firm—Cushman, Darby & Cushman

[57] ABSTRACT
A device for measuring the tension of relatively taut strings of tennis rackets or the like. The device comprises a single piece of material formed to have a handle, a string engaging portion, and a resilient portion joining the two. The string engaging portion bears a calibrated scale and a reference mark. The handle includes an index mark positioned such that when the handle is twisted relative to the engaging portion as the latter is secured to a string, measurement of tension is indicated on the scale by the index mark when the reference mark is in alignment with the string being tested.

8 Claims, 6 Drawing Figures

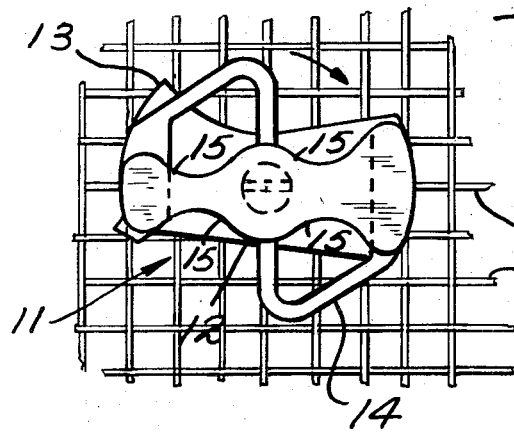
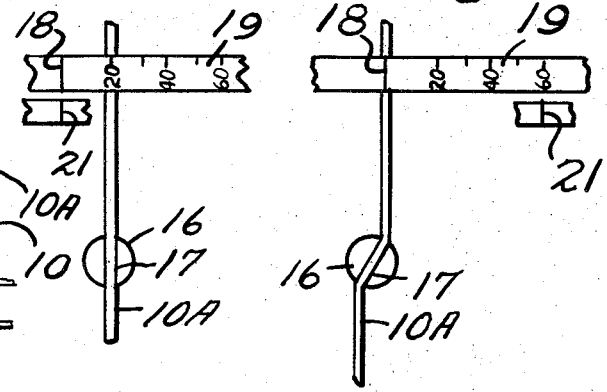
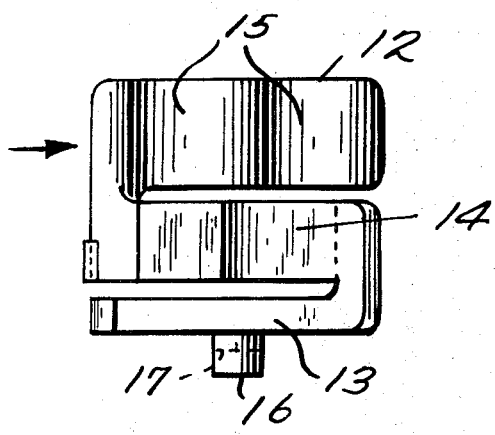
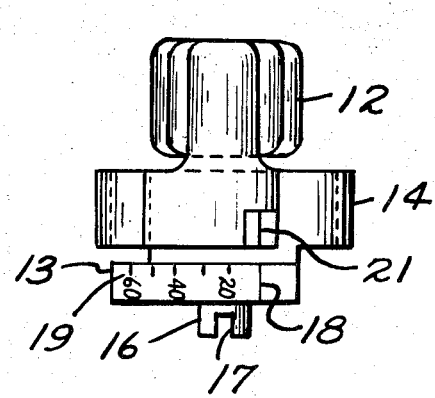
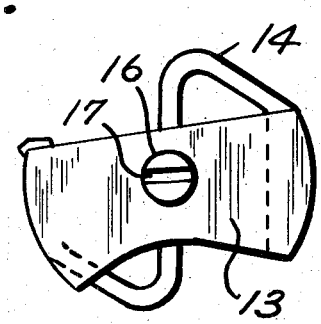

3,831,442

STRING TENSION MEASURING DEVICE

BACKGROUND OF THE INVENTION AND DESCRIPTION OF PRIOR ART

Arrangements are known which may be utilized for measuring string tension in the textile industry and for measuring the tension of strings which are strung on tennis rackets or the like during manufacture or repair. However, these devices have the shortcomings of being expensive, cumbersome and formed from a number of parts which have to be delicately balanced for achieving the accuracy desired.

With the increasing popularity of racket sports such as tennis, squash and the like, the need has developed for a simple, inexpensive, rugged and portable device which can be used by participants in these sports to determine whether the strings of their rackets are of correct tautness.

Although other applications are contemplated, the present invention has been designed primarily to permit the user to detect changes in the string tension of his racket so that he can determine when the racket should be restrung.

Prior art devices, while generally capable of measuring string tension to a fairly accurate degree, do not lend themselves to the convenience and economy of the apparatus of the present invention.

It is therefore an object of this invention to provide a simple, inexpensive, portable and easily manufactured string tension measuring device for testing the tautness of racket strings.

It is a further object of the present invention to provide a rugged and easily utilized measuring device which does not suffer from the disadvantages and limitations of delicately balanced moving parts.

SUMMARY OF THE INVENTION

There has been provided a device for measuring the tension of a relatively taut string. This device includes a single piece of material formed to have a handle portion and a string engaging portion. These two portions of the device are joined by a resilient portion. A calibrated scale and an associated reference mark are provided on the string engaging portion which also includes a slotted element for engaging the string. The handle includes an index mark arranged such that when the handle is twisted against the force of the resilient portion so as to produce relative movement between the string engaging portion and the handle, a measurement of tension is indicated by the position of the index mark with respect to the calibrated scale when the reference mark is in alignment with the string.

DESCRIPTION OF THE DRAWINGS

The present invention can be appreciated further by reference to the accompanying drawings wherein:

FIG. 1 is a top plan view of a preferred embodiment of the invention shown in engagement with the strings of a tennis racket;

FIG. 2 is a side elevational view of the apparatus shown in FIG. 1 illustrating its one-piece construction;

FIG. 3 is a bottom plan view of the structure shown in FIGS. 1 and 2 illustrating the string engaging element thereof;

FIG. 4 is an end view of the structure taken in the direction of the arrowhead in FIG. 2 and illustrating the calibrated scale, the reference mark and the index mark; and FIGS. 5 and 6 schematically show the operation of the structure of the present invention for testing the tension of a racket string.

DESCRIPTION OF THE PREFERRED EMBODIMENT

In FIG. 1 there are shown portions of strings 10 of a conventional tennis racket, along with the device constituting the present invention illustrated as engaging one of the strings 10A. The string tension measuring device, indicated generally as 11, is formed of a single piece of material, preferably a molded synthetic. Typical materials for this purpose are polyphenylene oxides and polycarbonates, such as are marketed by the General Electric Company under the trademarks Noryl and Lexan, respectively. The apparatus includes a handle portion 12, a string engaging portion 13 and a portion 14 joining portions 12 and 13. The portion 14 comprises a web having a generally Z-shape (FIGS. 1 and 3) joined at its opposite ends to portions 12 and 13, respectively. When portions 12 and 13 are moved relative to one another (as will hereafter be described), portion 14 is deformed by an amount less than its elastic limit permitting it to act like a spring to return portions 12 and 13 to their normal positions when the forces causing deformation are removed.

In FIGS. 1 and 2 the handle portion 12 is shown as having recesses 15 therein for accommodating the fingers of the user so as to provide a grip.

As can be seen in FIGS. 2–4, the string engaging portion 13 includes a nub 16 having a slot 17 disposed therein. The slot 17 is fashioned so as to receive one of the strings 10 of the tennis racket so that the tension of that string may be accurately measured.

In FIG. 4 there are illustrated a reference mark 18 and a calibrated scale 19 located on an outer curved surface on portion 13. An index mark 21 is provided on the outer curved surface of handle portion 12 to cooperate with scale 19 in determining the tension of a tennis racket string 10 in a manner which now will be described.

As can be seen in FIGS. 1–4, the handle portion 12 and the string engaging portion 13 are stacked in spaced relationship in separate planes. The resilient portion 14 lies in a third plane and is interposed between portions 12 and 13. This arrangement of the several portions of the device facilitates its molding and contributes to the compactness of the device.

In operation, the user places a string 10A within the slot 17 of nub 16. At this time the reference mark 18 is not in alignment with the string 10A being tested, as shown schematically in FIG. 5. The handle portion 12 is twisted in a clockwise direction, as indicated by the arrow in FIG. 1, and as this occurs the nub 16 firmly engages the string. Both handle portion 12 and the interconnected string engaging portion 13 rotate in a clockwise direction, but as a result of the constraint imposed upon portion 13 by the taut string 10A, portion 13 does not rotate to the degree of handle 12. Instead, the twisting force on handle 12 acts through the resilient portion 14 and portion 13 to deform string 10A as shown in FIG. 6. As this occurs, portion 14 is deformed. The more taut the string, the greater is the amount of rotation of handle 12 required to rotate the string engaging portion 13. The deformation characteristics of resilient portion 14 permit the inequality of rotational movement between portions 12 and 13.

The user continues to rotate the handle clockwise until such time as the reference mark 18 on portion 13 is in alignment with the string being tested (FIG. 6). At this moment the index mark 21 on handle portion 12 is positionally related to the scale 19 to permit a reading from the scale. By proper calibration of the scale with respect to the positions of reference mark 18 and index mark 21, an accurate determination of the string tension is obtained.

On relaxation of the clockwise twisting force on handle portion 12, the resiliency of the portion 14 connecting portions 12 and 13 returns the handle and string engaging portions to their normal positions relative to one another and releases the string 10A from its distorted state.

It can be seen from FIGS. 4-6 that the device disclosed herein measures string tension up to 60 pounds.

This range is that normally associated with tennis racket strings. However, it is apparent that this device may be used to measure higher or lower amounts of tension in different applications. This can be done by proper design of the resilient portion 14 to achieve the required deformation characteristics and the appropriate calibration of the scale arrangement.

While there has been described a preferred embodiment of the present invention, it will be obvious to those skilled in the art that various changes and modifications may be made herein without departing from the invention. For example, the reference mark 18 need not be on the string engaging portion, and the relative positions of the scale 19 and index 21 may be reversed. Such modifications can be made so long as suitable calibration is utilized. Additionally, other configurations than a Z-shape can be utilized for the resilient portion 14. The nub 16 can also be offset from the position shown in the drawings of the illustrative embodiment so as to permit an enlarged scale to be employed. It is therefore intended that the appended claims cover all such modifications and changes as fall in the true spirit and scope of the invention.

What is claimed is:

1. A device for measuring the tension of a taut string, comprising:
    a unitary construction including handle and string engaging portions stacked in spaced relationship in separate planes and a resilient portion interposed between and joining the handle and string engaging portions;
    a calibrated scale on one of the handle and string engaging portions;
    an index mark on the other of the handle and string engaging portions;
    a reference mark on one of the handle and string engaging portions; and
    means for securing the string engaging portion to said string such that on displacement of the handle portion, said resilient portion is deformed to permit relative displacement to occur between the handle and string engaging portions whereby the index mark and scale are brought into operating relationship when said reference mark reaches a predetermined position.

2. A device as set forth in claim 1, wherein said construction is formed from a single piece of material.

3. A device as set forth in claim 2, wherein said material is a polycarbonate.

4. A device as set forth in claim 2, wherein said material is a polyphenylene oxide.

5. A device as set forth in claim 1, wherein said resilient portion comprises a Z-shaped web connected at one of its ends to said handle portion and at the other of its ends to said string engaging portion.

6. A device as set forth in claim 1, wherein said securing means comprises a nub formed as part of said string engaging portion and having a slot therein to receive the string.

7. A device as set forth in claim 1, wherein said reference mark is on the string engaging portion.

8. A device as set forth in claim 1, wherein said predetermined position comprises alignment of the string being measured and the reference mark.

* * * * *